United States Patent [19]

Walsh et al.

[11] Patent Number: 4,760,260
[45] Date of Patent: Jul. 26, 1988

[54] DIAGNOSTIC WHOLE BODY COUNTER

[75] Inventors: Patrick A. Walsh, Vincentown, N.J.; John P. Andrews, Concord Township, Delaware County, Del.; Robin R. Shult, Voorhees, N.J.

[73] Assignee: Westinghouse Electric Corp., Pittsburgh, Pa.

[21] Appl. No.: 897,022

[22] Filed: Aug. 15, 1986

[51] Int. Cl.$^4$ .......................... G01J 1/42; G01T 1/18
[52] U.S. Cl. ................................ 250/394; 250/363 S; 250/370.01; 250/374
[58] Field of Search ............... 250/363 S, 394, 374, 250/370 F, 366

[56] References Cited

U.S. PATENT DOCUMENTS

| | | |
|---|---|---|
| D. 275,083 | 8/1984 | Pollard . |
| 3,376,417 | 4/1968 | Keck et al. . |
| 3,431,413 | 3/1969 | Anderson et al. . |
| 3,790,799 | 2/1974 | Stein et al. . |
| 3,832,545 | 8/1974 | Bartko . |
| 3,898,457 | 8/1975 | Packard et al. . |
| 3,970,852 | 7/1976 | Richey et al. . |
| 4,012,636 | 3/1977 | Engdahl et al. . |
| 4,253,025 | 2/1981 | Fergus ................................ 250/394 |
| 4,352,019 | 9/1982 | Pollard . |
| 4,472,822 | 9/1984 | Swift . |
| 4,510,758 | 4/1985 | Tench, Jr. . |

FOREIGN PATENT DOCUMENTS

2517752 11/1976 Fed. Rep. of Germany ... 250/363 S

Primary Examiner—Janice A. Howell

[57] ABSTRACT

A diagnostic whole body counter includes both a detector for external or beta radiation and a detector for internal or gamma radiation. A subject stands on a platform and external radiation detectors inset in a back wall of the radiation detector are employed to quickly check for any external radiation on the subject. After it is determined that no external radiation is present, the subject is scanned using an internal radiation detector which is transported vertically along the length of the subject. An intrinsic germanium detector is employed as the internal radiation detector to provide a highly accurate determination of radiation dosage. Variable diameter lead collimators are positioned in front of the internal radiation detector to vary the size of the area scanned by the internal radiation detector.

23 Claims, 4 Drawing Sheets

DIAGNOSTIC WHOLE BODY COUNTER

BACKGROUND OF THE INVENTION

This invention relates to a whole body counter for detecting and counting internal and external radiation contamination of a human subject.

Strict regulation of the nuclear power plants in operation has led to requirements that power plants carefully monitor their personnel to detect any internal radiation contamination, and to determine the extent of any contamination which is detected. During normal operation of a nuclear power plant, radiation detectors are routinely used to detect contamination of plant personnel. Government regulations require that a dosimetry record be reported to the Nuclear Regulatory Commission for each individual working in a plant. In particular, it is required that a worker's radiation dose be determined both at the time the worker is assigned to a plant and at the time the worker leaves the plant for a new assignment. This is done both to ensure the safety of the workers in nuclear power plants, and to develop a contamination profile to determine which nuclear power plants are producing the greatest amount of contamination.

During normal operation of a nuclear power plant, the preparation of the dosimetry records does not present any particular difficulties since there are normally 200 to 300 people working at a plant. However, nuclear power plants are in normal operation for approximately 18 months, after which time the plant must be shut down for approximately 6 weeks for refueling and maintenance. During this maintenance period, as many as 2,000 to 3,000 workers will work in the plant. Since these workers are assigned to the plant and leave the plant within this six week period, it becomes a cumbersome task to develop the necessary dosimetry records during this time period. This is further compounded by the fact that many of the workers will need to enter the plant (and thus have their dose determined before entry) at the beginning of the six week maintenance period. Because of the large volume of monitoring which must take place during the maintenance period, many companies temporarily obtain auxiliary whole body counters housed in portable trailers for use during the maintenance period to perform the necessary radiation monitoring. These auxiliary whole body counters are used in addition to the whole body counters which are used at the plant during normal operation, in order to handle the large volume of personnel which must be monitored during the maintenance period.

Early whole body counters were placed in small shielded rooms with a bed. Later, the so-called shadow shield design was developed which was much smaller in size. Currently, this shadow shield whole body counter design is in wide use. However, currently available whole body counters are relatively slow in that they require 8 to 10 minutes to perform a detection procedure for a single subject. In addition, currently available whole body counters have low resolution because they employ sodium iodide detectors (approximately 8% resolution). The resolution refers to the ability of a detector system to resolve a peak at a specific energy, and is best shown by a graph of the number of events of energy versus the energy level, where the particular energy level is used to identify the type of radionuclide (e.g., cesium 137, cobalt 60, etc.). While sodium iodide detectors are relatively inexpensive, their low resolution impairs the accuracy of the information produced when several different energies of radiation contamination are detected. A sodium iodide detector will produce a characteristic (number of events of energy versus energy level) having rounded peaks which are spread out, thereby obscuring information for identifying the particular radionuclide. Since the amount of radiation is determined by integrating the area under a peak, the more a peak is spread out, the more inaccurate the radiation reading will be. Thus, sodium iodide detectors have relatively low resolution. A direct result of this low resolution is that sodium iodide detectors require 2 to 3 minutes of computer time to process the output signal of the detector because of the complex program required for filtering noise from the output signal.

Another disadvantage of currently available whole body counters is that they are not capable of separately identifying whether the contamination is internal or external. Internal and external radiation monitoring differ because of the penetrating ability of the different types of radiation. Beta radiation has a low penetrating ability and therefore can only be monitored on the exterior of the subject, while gamma radiation has a relatively high penetrating ability, so that it will tend to penetrate through at least a portion of the subject. For example, gamma radiation is used for X-ray purposes. The external contamination will include gamma radiation and beta radiation. This phenomenon will interfere with the gamma rays emitted from inside the subject's body. Therefore, it is important to evaluate the external contamination to prevent the false reporting of internal contamination. Nuclear power plants will typically be subject to the presence of both beta and gamma radiation.

While most nuclear power plants preliminarily employ a hand-held scanner to check for external radiation on a subject, such scans are not always accurate. When currently available whole body counters using sodium iodide detectors are employed, the radiation which is detected can be external or internal. Further, with available whole body counters, the information developed by the counter is typically evaluated at a remote location, so that the contamination which is detected by the sodium iodide detector may not be immediately identified as external contamination. In fact, the presence of external contamination may not be determined for some time. The existance of a delay in determining that contamination is external is disadvantageous. Thus, a significant time delay occurs in the time for determining the nature of any internal contamination. In addition, the lengthy original scan provides little useful information because of the occurrence of the external contamination.

There is a need in the art for a radiation detector which is capable of quickly detecting the presence of any external radiation, and which is capable of providing accurate information concerning the presence of any internal contamination.

SUMMARY OF THE INVENTION

The present invention is directed to a radiation detector which overcomes the disadvantages of currently available whole body counters.

In particular, the present invention is directed to a radiation detector which is capable of separately detecting internal and external radiation contamination of a subject.

It is a further object of the present invention to provide a radiation detector which is capable of quickly detecting whether any external radiation is present and which performs the detection of internal radiation only after it has been determined that no external radiation is present.

A still further object of the present invention is to provide a flexible radiation detector which is convenient to use for a variety of types of subjects, and which will provide highly accurate information concerning the nature of any internal radiation contamination.

The radiation detector of the present invention includes means for detecting substantially only external radiation substantially anywhere on the body of a subject, and means for detecting internal radiation within the body of the subject. The means for detecting external radiation comprises a means for detecting beta radiation, such as a plurality of gas flow proportional detectors. These gas flow proportional detectors are capable of quickly detecting whether there is any external radiation contamination on the subject. The means for detecting internal radiation comprises a means for detecting gamma radiation, such as an intrinsic germanium detector which is capable of resolving a number of different energies, thereby making it possible to accurately identify specific radionuclides in the body of the subject.

In the preferred embodiment of the present invention, the radiation detector includes a platform for supporting the subject, a rear shield and external radiation detector assembly extending from the platform, and an internal radiation detector assembly positioned adjacent the subject when the subject is supported on the platform, and positioned opposite the rear shield and external radiation detector assembly. The rear shield and external radiation detector assembly includes means for detecting external radiation, while the internal radiation detector assembly includes means for detecting internal radiation within the body of the subject. The internal radiation detector assembly includes means for transporting an intrinsic germanium detector vertically so as to scan the body for internal radiation. Further, the intrinsic germanium detector is positioned in a housing having a variable size collimator for performing detection on different areas of the body.

The radiation detector of the present invention has a number of advantages over available detectors since it combines detection of both external and internal radiation, while providing a highly accurate determination of the dose received by a worker. Further, the detection of external radiation can be carried out rapidly, and if external radiation contamination is found, the subject can be removed from the detector and processed for additional cleaning procedures (e.g., showering) before returning to be tested for internal radiation contamination. Thus, it is not necessary to carry out the lengthier internal radiation scan if external radiation is initially detected. Once it is determined that no external radiation is present, then the internal radiation detector is employed to determine the quantity and nature of any internal radiation contamination. Further, collimators of varying size are used in conjunction with the internal radiation detector to focus on particular body organs when it is determined that internal radiation is present.

As a result of the relatively small size of the intrinsic germanium detector, the lead shield which shields the intrinsic germanium detector can be smaller and lighter than the shielding for currently available detectors, and limited back shielding of the intrinsic germanium detector is required.

The highly accurate and versatile nature of the radiation detector of the present invention makes it particularly suitable for compiling worker dosimetry during the maintenance period of a nuclear power plant, by providing accurate dosage records quickly. Further, the relatively quick and accurate nature of the detection provided by the radiation detector of the present invention allows a subject to be quickly apprised of any health dangers which might threaten the subject. As a result, the worker will be able to quickly seek medical attention and treatment for the specific type of radiation identified by the radiation detector of the invention.

These together with other objects and advantages which will become subsequently apparent, reside in the details of construction and operation as more fully hereinafter described and claimed. Reference being held to the accompanying drawings forming a part hereof, wherein like numerals refer to like parts throughout.

DESCRIPTION OF THE PREFERRED EMBODIMENT

Figure 1:
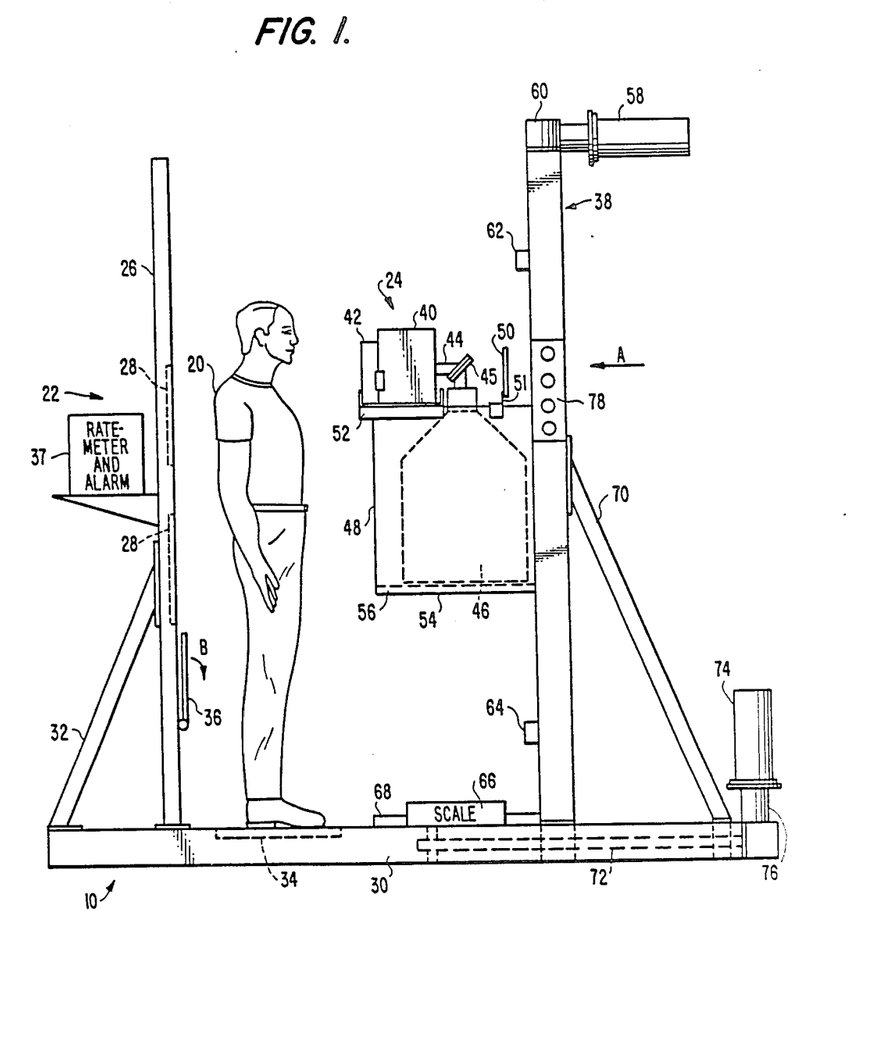
FIG. 1 is a side view of the radiation detector of the present invention for detecting radiation contamination of a subject.

FIG. 1 is a side view of a radiation detector 10 in accordance with the present invention, for separately detecting both external and internal radiation contamination of a subject 20. The radiation detector 10 of the present invention includes a rear shield and external radiation detector assembly 22, and an internal radiation detector assembly 24. The rear shield and external radiation detector assembly 22 includes a back wall 26 having external radiation detectors 28 inset therein. The subject 20 is supported on a platform 30 from which the rear shield and external radiation detector assembly 22 extends. The back wall 26 is supported by braces 32, with the braces 32 and the back wall 26 being fastened (e.g., by bolts) to a platform 30. The platform 30 may have inset therein an external radiation detector 34 which is similar to the external radiation detectors 28, and which is used to detect external contamination of the feet. If desired, a flip down seat 36 may be mounted on the back wall 26 and flipped down in the direction of arrow B if it is desirable or necessary to have the subject 20 seated during the detection procedure. A ratemeter and alarm circuit 37 is connected to the external radiation detectors 28.

The internal radiation detector assembly 24 is movably mounted on a front wall 38 for vertical transport along the length of the subject 20. The internal radiation detector assembly 24 includes a detector housing 40 for housing an internal radiation detector described below, and a removable collimator 42 which determines the area of the subject to be scanned. A cold finger 44 extends, via a coupling 45, from the detector housing 40 into a Dewar flask 46 which is enclosed within a housing 48. The Dewar flask 46 has a 20 liter capacity and is used to store approximately 15 liters of liquid nitrogen which is required to keep the internal radiation detector at a low temperature. A back radiation shield 50 is mounted on the housing 48 via a support 51, to prevent radiation from impinging the detector within the detector housing 40. The detector housing 40 includes heavy lead shielding and is supported on a frame 52. Positioned in the bottom 54 of the housing 48 is a foam pad 56 for supporting the Dewar flask 46 and for absorbing vibrations caused when the internal radiation detector assembly 24 is transported to scan the subject 20. A motor 58 and a gear box 60 are used to transport the internal radiation detector assembly 24 vertically to scan the subject 20. An upper limit switch and light source 62 is mounted on the front wall 38 to specify the upper limit of travel of the internal radiation detector assembly 24. In addition, the light source portion of the upper limit switch and light source 62 can be used to properly position the subject on the platform 30. A lower limit switch and light source 64 is used for purposes similar to the upper limit switch and light source 62. A scale 66 is mounted on the top of the platform 30, so that when the internal radiation detector assembly 24 is transported to its lowermost position, the Dewar flask 46 can be weighed to determine how much liquid nitrogen remains within the Dewar flask 46. This is accomplished by constructing the bottom 54 of the housing 48 to be a false bottom. A toe guard 68 is also provided on the platform 30 to prevent injury to the toes of the subject 20. The front wall 38 is supported by braces 70, and both the front wall 38 and the braces 70 are coupled to be driven by a drive screw 72 which is actuated by a motor 74 and a gear box 76. A control panel 78 is provided to allow an operator or attendant to manually actuate the motors 74 and 58. By actuating the motor 74, the front wall 38 (and thus the internal radiation detector assembly 24) can be moved horizontally towards and away from the subject 20. In this manner, the geometry of the radiation detector 10 of the present invention can be varied to provide the most appropriate configuration for the subject 20. Thus, the radiation detector 10 of the present invention can be employed for different size subjects 20.

Figure 2:
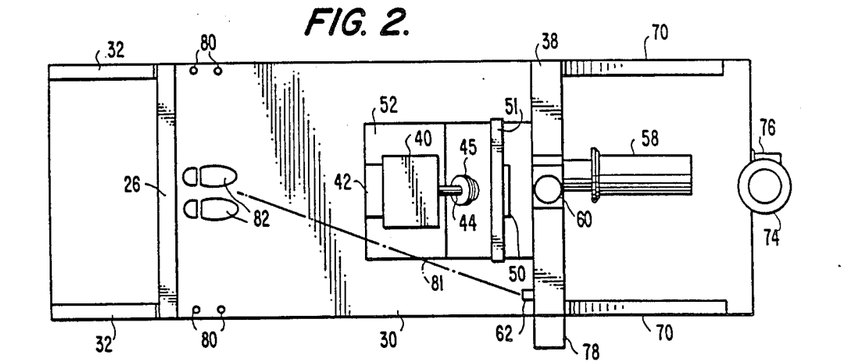
FIG. 2 is a plan view of the radiation detector of FIG. 1.

FIG. 2 is a plan view of the radiation detector 10 of FIG. 1, which shows that the platform 30 has a plurality of bolt holes 80 for accommodating a variety of positions for the back wall 26. Further, since the assembly of the back wall 26 and the front wall 38 is not permanent, the radiation detector 10 may be disassembled so that it can be transported through relatively small areas (e.g., through elevators, doorframes, etc.). As illustrated in FIG. 2, the upper limit switch and light source 62 is capable of generating a light beam 81 which can be used to position the subject 20 in the appropriate spot on the platform 30. Alternatively, indicia 82, such as footprints, may be imprinted on the platform 30 to specify the correct position for the subject 20.

Figure 3:
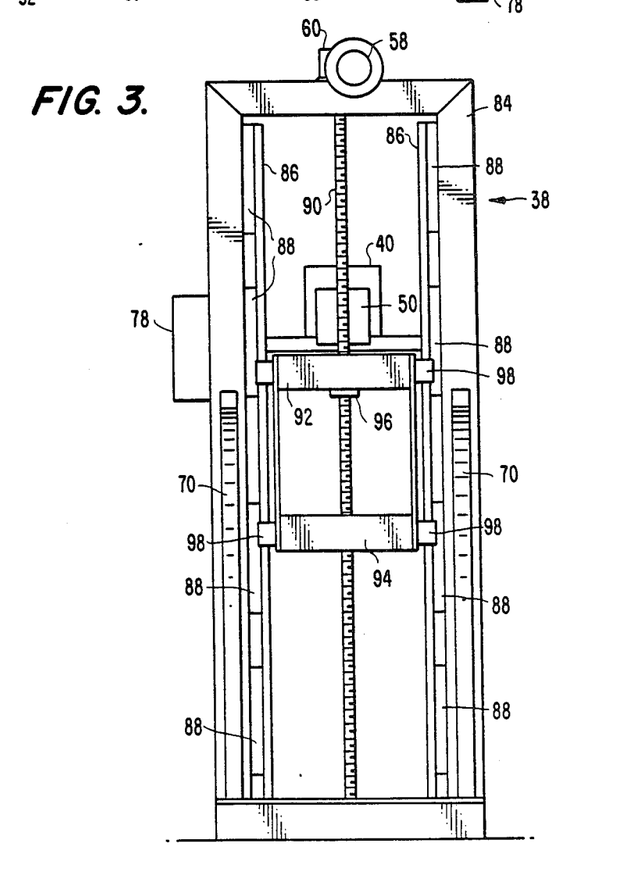
FIG. 3 is a side view of the radiation detector of FIG. 1, taken from the direction of arrow A of FIG. 1 and in front of the motor 74 and gear box 76 of FIG. 1.

FIG. 3 is a side view of the radiation detector 10 of FIG. 1 taken from the direction of arrow A in FIG. 1 and in front of the motor 74. FIG. 3 discloses the means for transporting the internal radiation detector assembly 24. The front wall 38 comprises a support frame 84, and guide rails 86 are mounted on the inner periphery of the support frame 84 by rail supports 88. A worm gear 90 extends along the height of the front wall 38 and is coupled to the motor 58 via the gear box 60. Mounting brackets 92 and 94 support the internal radiation detector assembly 24, and mounting bracket 92 is coupled to a bearing 96 which rides on the worm gear 90. In the preferred embodiment, the bearing 96 comprises a plurality of ball bearings which act as a screw riding on the worm gear 90. Bearings 98 extend from the mounting brackets 92 and 94 and are in slidable engagement with the guide rails 86. In the preferred embodiment, the bearings 98 are pillow blocks which slide along the guide rails 86 as the worm gear 90 is driven to transport the internal radiation detector assembly 24 vertically along the front wall 38.

Figure 4:
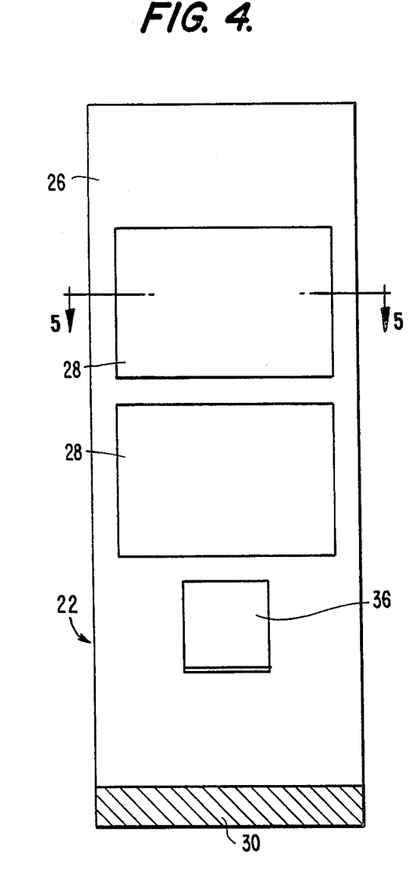
FIG. 4 is a front view of the side of the rear shield and external radiation detector assembly 22 of FIG. 1, which is adjacent to the posterior of the subject.

FIG. 4 is a front view of the side of the rear shield and external radiation detector assembly 22, which is adjacent the posterior of the subject 20. In the preferred embodiment, a plurality of external or beta radiation detectors 28 are inset in the back wall 26 to detect external radiation. These external radiation detectors 28 together with any other external radiation detectors (e.g., external radiation detector 34) form a means for detecting substantially only external radiation substantially anywhere on the body of the subject 20. In the preferred embodiment, a plurality of gas flow proportional detectors are employed as the external radiation detectors 28. For example, a Model 43–48 gas flow proportional detector manufactured by Ludlum Measurement Company of Sweetwater, Tex. may be employed for the external radiation detectors 28.

Figure 8:
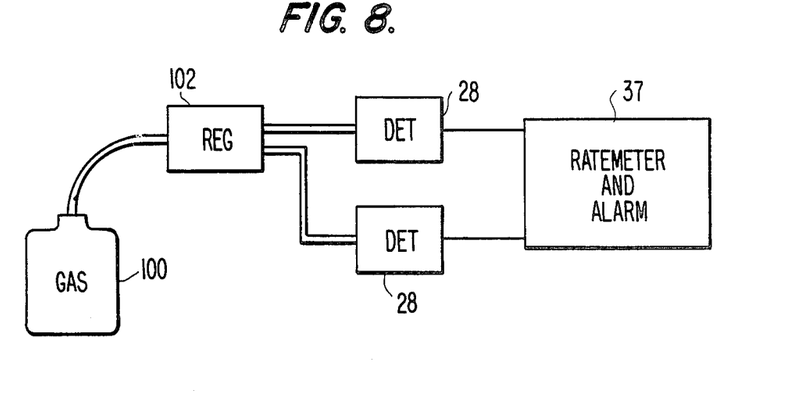
FIG. 8 is a block diagram of the circuit for external radiation detection.

Referring to FIG. 8, the gas flow proportional detectors 28 (and detector 34 if desired) are coupled to a supply of gas 100 via a gas flow regulator 102 which provides the gas necessary to operate the gas flow proportional detectors 28. The gas supplied to the detectors 28 is, for example, P-10 (90% argon and 10% methane), propane, methane or geiger gas. The gas flow proportional detectors 28 are sensitive to beta radiation in that they detect 100% of any beta radiation and only 1% of gamma radiation. Thus, the external radiation detectors 28 detect substantially only beta radiation. The external radiation detectors 28 provide an output signal to the ratemeter and alarm circuit 37 which generates an alarm signal if the count rate for the number of energy events (e.g., 50,000 to 100,000 counts per minute) exceeds a predetermined level. The ratemeter and alarm circuit 37 may be, for example, a model SRM-100 ratemeter manufactured by Eberline Instrument Co. of Santa Fe, N. Mex.

Figure 5:
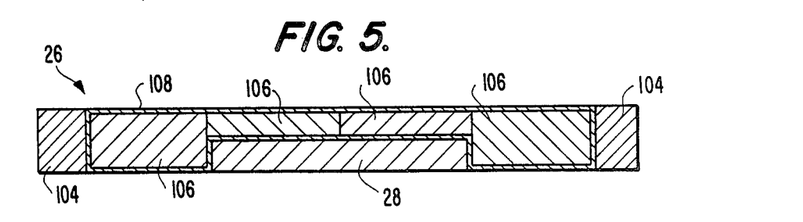
FIG. 5 is a cross-sectional view taken along line 5—5 of FIG. 4.

FIG. 5 is a cross-sectional view of the rear shield and external radiation detector assembly 22 taken along lines 5—5 of FIG. 4. As indicated above, each external radiation detector 28 is inset within the back wall 26. The back wall 26 includes a frame 104 for supporting shielding material 106. In the preferred embodiment, the shielding material 106 is formed by lead bricks which are stacked within a stainless steel housing 108. The lead bricks 106 are tongue in groove bricks which are fit together to form a wall which is 2 inches thick. In the preferred embodiment, the individual bricks are up to 2 inches by 4 inches by 8 inches. By forming the shielding material 106 of lead bricks, the task of disassembling the heavy lead shielding material and transporting it to a new site is simplified. The lead which is used as the shielding material 106 is preferably chemical purified lead.

Figure 6:
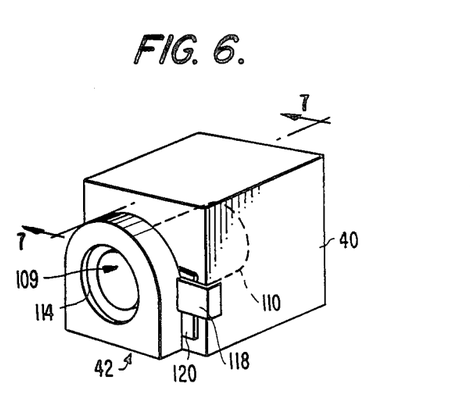
FIG. 6 is a perspective view of the detector portion of the external radiation detector assembly 24.
Figure 7:
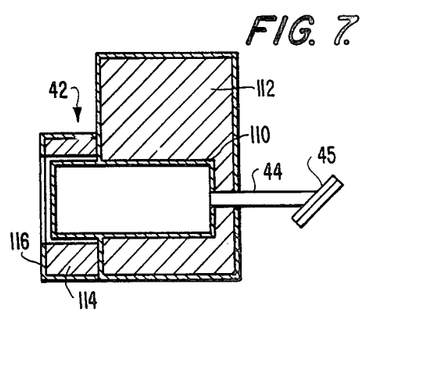
FIG. 7 is a cross-sectional view taken along line 7—7 of FIG. 6.

FIG. 6 is a perspective view of the portion of the internal radiation detector assembly 24 which houses means for detecting internal (i.e., gamma) radiation, and FIG. 7 is a cross-sectional view taken along line 7—7 of FIG. 6. In the preferred embodiment, the means for detecting internal radiation is an intrinsic germanium detector assembly 109 including a Model IGC 25 intrinsic germanium detector manufactured by Princeton Gamma-Tech, Inc. of Princeton, N.J. (which also manufactures the cold finger 44 and Dewar flask 46 arrangement). The intrinisic germanium detector assembly 109 includes an intrinsic germanium detector housed with a preamplifier (Model RG-11 B/C manufactured by Princeton Gamma Tech) in a vacuum cup 110 which is connected to the copper cold finger 44, which is in turn inserted into the Dewar flask 46 (FIG. 1). The vacuum cup 110 is surrounded by lead shielding 112, and the lead shielding 112 and vacuum cup 110 are housed within the housing 40 which, in the preferred embodiment, comprises a stainless steel case. The lead shielding 112 may be in the form of lead bricks which are cut to fit around the vacuum cup 110.

The intrinsic germanium detector is capable of resolving energies within a range of 20 KeV to 2–3 MeV, so that it is possible to identify a number of specific radionuclides. The high resolution of the intrinsic germanium detector also allows accurate quantification of the amount of radiation in the body, and accurate estimation of the radiation exposure or dose. Further, since the intrinsic germanium detector is capable of scanning relatively small areas of the body, the dose for specific organs (e.g., thyroid, lungs, stomach, intestines, bladder, muscle, bone, etc.) can be identified. This is significant because certain radiation (for example, radiation in the stomach) will be passed out of the system within a short period of time. Therefore, if radiation is detected in the stomach, the subject may be asked to return at a later time for an additional scan to determine whether the radiation has passed from the body. This enhances the ability of the radiation detector 10 to provide an accurate determination of dose. The high accuracy of the intrinsic germanium detector is in contrast to prior art sodium iodide detectors which are incapable of coping with mid and upper level ranges of energies. Specifically, the intrinsic germanium detector has a resolution which is several times better than the resolution of a sodium iodide detector in the upper range. In addition, the sodium iodide detector is incapable of detecting all isotopes of interest. Further, because of the high resolution of the intrinsic germanium detector, a much simpler computer program is required (as opposed to the lengthy filtering program necessary for sodium iodide detectors), so that only 10 to 15 seconds of computer time are required to process the output of the intrinsic germanium detector.

In the preferred embodiment, the collimator 42 comprises a lead collimator 114 surrounded by a stainless steel case 116. The lead collimator 114 determines the size of the area which is scanned by the intrinsic germanium detector enclosed within the vacuum cup 110. Therefore, the lead collimator 114 is preferably formed by custom shaped pieces which are positioned about one end of the vacuum cup to determine the area to be scanned. The lead collimator 114 may produce an opening at the end of the vacuum cup 110 which is less than, equal to or greater than the diameter of the end of the vacuum cup 110. For purposes of illustration, FIG. 7 illustrates a situation in which the lead collimator 114 has been built to provide an opening having a diameter which is approximately the same size as the diameter of the vacuum cup 110. The housing 40 has clips 118 mounted thereon (only one of which is shown in FIG. 6), and the stainless steel case 116 for the lead collimator 114 has flanges 120 (only one of which is shown in FIG. 6) extending therefrom. The flanges 120 are capable of sliding between the housing 40 and the respective clips 118, so that the stainless steel case 116 can be slidably positioned in front of the housing 40. As a result, different size collimators 42 may be selectively inserted about the vacuum cup 110 which houses the intrinsic germanium detector, so that the area of the subject 20 to be scanned can be varied to provide organ resolution. After the stainless steel case 116 is removed, the lead collimator 114 is removed, a new lead collimator 114 (formed by a set of lead pieces which produce a different size opening) is formed about the vacuum cup 110, and a new stainless steel case 116 is slid into place. As an example of the uses of different size collimators 42, a wide scan can be initially employed to detect the presence of any internal radiation. If internal radiation is detected, then an appropriate collimator 42 can be positioned about the vacuum cup 110 to individually scan different organs (e.g., right or left lungs, thyroid, stomach, etc.).

Figure 9:
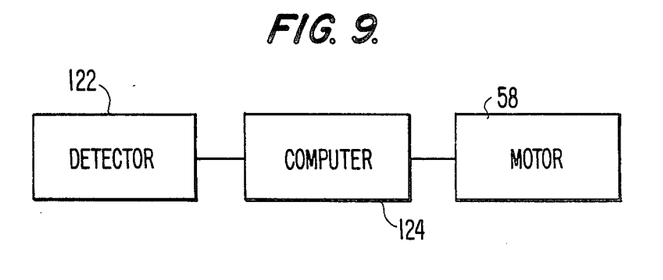
FIG. 9 is a block diagram of the circuit for internal radiation detection.

Referring to FIG. 9, a detector 122 which, in the preferred embodiment, is the intrinsic germanium detector, serves as the means for detecting internal radiation within the body of the subject 20. The detector 122 is electrically connected to provide an output signal to a computer 124 which is in turn connected to the motor 58. The computer 124 controls the operation of the motor 58 to control the scan of the internal radiation detector assembly 24. As indicated above, the motor 58 is an electrical stepping motor which is typically scanned at a fast rate so that it operates in a manner which appears to be almost continuous. However, the incremental stepping action of the motor 58 makes it possible to correlate the steps to specific positions along the length of the scan. In the preferred embodiment, the computer 124 is a standard personal computer, such as a DEC Minivax or an IBM PC, which uses commercially available software (e.g., the Whole Body Counting Software package sold by Nuclear Data or the Geligam Software package sold by EG&G Ortec) for analyzing the signal output by the intrinsic germanium detector 122. Alternately, if desired, any available stand alone multi-channel analyzer can be employed to analyze the output of the intrinsic germanium detector 122. Such multi-channel analyzers are well known in the radiation detection art.

In operation, the subject 20 will be asked to stand on the platform 30 and will be positioned either through the use of indicia 82 or light beam 81. The external radiation detectors 28 (and 34) are actuated for approximately 15 seconds (or continuously, if desired) to determine whether there is any beta radiation on the body of the subject 20. If beta radiation is detected, the subject 20 will be removed from the radiation detector 10 and will be processed for cleaning (e.g., showering, change of clothes, etc.) to attempt to remove the external radiation contamination. After this cleaning procedure has been accomplished, the subject 20 will be returned to the radiation detector 10, and the external radiation detectors 28 will again be actuated to determine whether all beta radiation has been removed from the body of the subject 20. Once it is determined that no external radiation is present, scanning for internal radiation is begun. Scanning for internal radiation can be accomplished in a number of ways. For example, the internal radiation detector assembly 24 can be moved to its upper limit as determined by the upper limit switch and light source 62, and the stepping motor 58 can then be actuated to scan the subject 20 vertically with the internal radiation detector 122. If it is determined that gamma radiation is present within the body of the subject 20, then a smaller diameter collimator 42 can be employed to scan specific organs of the subject 20 to determine the precise location of the internal contamination. Further, the subject 20 can be turned around on the platform 30 so as to determine front to back ratios for the contamination; that is, to determine whether the radiation contamination is in the front, the back or the middle of the subject 20. Once scanning has been completed, the subject 20 exits the radiation detector 10 and a new subject 20 enters the radiation detector 10. At that time, if the new subject 20 is an extremely large individual, it may be necessary for the operator of the radiation detector 10 to operate the control panel 78 to actuate the motor 74 to move the front wall 38 and the internal radiation detector assembly 24 further away from the back wall 26, allowing the new subject 20 sufficient room to stand within the radiation detector 10.

The radiation detector 10 of the invention is an extremely flexible radiation detector which is a variable position detector as well as a variable geometry detector. The radiation detector 10 provides quick detection of any external radiation contamination so as to avoid the necessity of conducting the lengthier internal radiation detection scan if external radiation is found to be present on the subject 20. Further, the radiation detector 10 allows for convenient entry, scanning and exit from the radiation detector 10 by a subject 20. In addition, the flexibility provided with respect to the size of the scanning area and the location of the subject 20 with respect to the internal radiation detector 122 allows for accurate detection of the precise location of internal radiation within the body of the subject 20. The radiation detector 10 has a number of modes of operation in that it can: (a) traverse the entire body of the subject 20; (b) operate in an open geometry mode (i.e., with a large collimator 42) for quick scans of the subject 20; (c) operate in a closed geometry mode (i.e., with a small collimator 42) for maximum sensitivity; and (d) perform chair-type counting by seating the subject 20 on the seat 36. Thus, the radiation detector 10 of the present invention combines both internal and external radiation detection to provide a quick and highly accurate determination of the internal dose received by a subject 20. In addition, the relatively small size of the internal radiation detector 122 allows the amount of lead shielding to be reduced, thereby making radiation detector 10 lighter and more transportable than prior art whole body counters.

The radiation detector of the present invention may be implemented in numerous ways. For example, although particular types of external radiation detectors 28 have been disclosed, any suitable type of radiation detector 28 may be employed as long as it is capable of accurately detecting substantially only external radiation (i.e., beta radiation). Further, the radiation detector 10 could be modified to employ detectors which detect only alpha radiation in situations where alpha radiation represents a primary hazard (e.g., uranium processing). Further, while a particular type of internal radiation detector has been disclosed, any internal radiation detector having sufficient accuracy may be employed. While the type of shielding which has been described is lead shielding, any suitable type of shielding which will prevent the detectors from obtaining false readings, may be employed. While the radiation detector 10 has been described as having a light beam 81 for positioning the subject within the radiation detector 10, two intersecting light beams could be provided so that the subject 20 is positioned at the intersection of the light beams. Further, an indicator light (e.g., an LED) could be mounted on the internal radiation detector assembly 24 to indicate when the internal radiation detector is operating. While the rear shield and external radiation detector assembly has been described as being bolted to the platform 30, a movable track arrangement could be provided so that the position of both the front wall 38 and the back wall 26 could be altered to vary the area available for the subject 20 within radiation detector 10.

The many features and advantages of the invention are apparent from the detailed specification, and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described and, accordingly, all suitable modifications and equivalents may be resorted to, falling within the scope of the invention.

What is claimed is:

1. A radiation detector for detecting radiation contamination of a subject, comprising:
   means for detecting substantially only external radiation substantially anywhere on the body of the subject; and
   means for detecting internal radiation within the body of the subject.

2. A radiation detector as set forth in claim 1, wherein said means for detecting substantially only external radiation comprises means for detecting beta radiation.

3. A radiation detector as set forth in claim 2, wherein said means for detecting beta radiation comprises a gas flow proportional detector.

4. A radiation detector as set forth in claim 2, wherein said means for detecting beta radiation comprises a plurality of gas flow proportional detectors.

5. A radiation detector as set forth in claim 2, wherein said means for detecting internal radiation comprises means for detecting gamma radiation.

6. A radiation detector as set forth in claim 5, wherein said means for detecting gamma radiation comprises an intrinsic germanium detector.

7. A radiation detector for detecting radiation contamination of a subject, comprising:
   a platform for supporting the subject;
   a rear shield and external radiation detector assembly extending from said platform, said rear shield and external radiation detector assembly including means for detecting substantially only external radiation substantially anywhere on the body of the subject; and an internal radiation detector assembly positioned adjacent the subject when the subject is being supported on said platform, and positioned opposite said rear shield and external radiation detector assembly, said internal radiation detector assembly including means for detecting internal radiation within the body of the subject.

8. A radiation detector as set forth in claim 7, wherein said means for detecting substantially only external radiation comprises at least one gas flow proportional detector.

9. A radiation detector as set forth in claim 8, wherein said means for detecting internal radiation comprises an intrinsic germanium detector, said radiation detector further comprising;
   a support frame extending from said platform; and
   means for transporting said intrinsic germanium detector along the support frame so as to scan the body of the subject for internal radiation.

10. A radiation detector as set forth in claim 9, wherein said internal radiation detector assembly further comprises a collimator positioned adjacent said intrinsic germanium detector to control the size of the portion of the subject to be scanned.

11. A radiation detector as set forth in claim 10, wherein said collimator is removably positioned adjacent said intrinsic germanium detector, so that different size collimators may be employed.

12. A radiation detector as set forth in claim 11, wherein said internal radiation detector assembly further comprises:
   means for shielding the intrinsic germanium detector from radiation other than radiation from the subject;
   a housing extending below said means for shielding said intrinsic germanium detector; and
   a Dewar flask positioned within said housing and in heat exchange contact with said intrinsic germanium detector, said Dewar flask containing a supply of liquid nitrogen.

13. A radiation detector as set forth in claim 12, wherein said housing has a false bottom, and wherein said radiation detector further comprises a scale positioned on said platform below said housing, so that when said internal radiation detector assembly is transported to a lowermost position, said scale is capable of weighing the amount of liquid nitrogen remaining in said Dewar flask.

14. A radiation detector as set forth in claim 11, further comprising means for positioning the subject on said platform.

15. A radiation detector as set forth in claim 14, wherein said positioning means comprises at least one light source, mounted on said support frame, for generating a light beam which is used to position the subject on said platform.

16. A radiation detector as set forth in claim 9, wherein said means for transporting said intrinsic germanium detector comprises a stepping motor.

17. A radiation detector as set forth in claim 16, further comprising a limit switch mounted on said support frame for stopping said transporting means when said intrinsic germanium detector has been transported to a predetermined position.

18. A radiation detector as set forth in claim 9, further comprising means for transporting said support frame and said internal radiation detector assembly horizontally so as to vary the distance between said internal radiation detector assembly and said rear shield and external radiation detector assembly.

19. A radiation detector as set forth in claim 7, wherein said rear shield and external radiation detector assembly includes a back wall extending from said platform, and wherein said means for detecting substantially only external radiation comprises a first gas flow proportional detector mounted on said back wall and a second gas flow proportional detector mounted in said platform.

20. A radiation detector for detecting radiation contamination of a subject, comprising:
   means for supporting the subject;
   a rear shield and external radiation detector assembly extending from said support means, said rear shield and external radiation detector assembly including:
      means for detecting substantially only beta radiation substantially anywhere on the subject; and
      means for shielding said beta radiation detection means from radiation other than radiation from the subject; and
   an internal radiation detector assembly positioned adjacent the subject when the subject is supported by said support means, and positioned opposite said rear shield and external radiation detector assembly, said internal radiation detector assembly including means for detecting gamma radiation within the body of the subject.

21. A radiation detector as set forth in claim 20, further comprising means for transporting said gamma radiation detection means to scan the body of the subject when the subject is supported by said support means.

22. A radiation detector as set forth in claim 21, wherein:
   said beta radiation detecting means comprises at least one gas flow proportional detector; and
   said gamma radiation detecting means comprises an intrinsic germanium detector.

23. A radiation detector as set forth in claim 22, wherein said internal radiation detector assembly further comprises a collimator removably positioned adjacent said intrinsic germanium detector to control the size of the portion of the subject to be scanned.

* * * * *